(12) United States Patent
Kirkpatrick et al.

(10) Patent No.: US 6,871,209 B1
(45) Date of Patent: Mar. 22, 2005

(54) SYSTEM AND METHOD FOR MANAGING TRANSACTION MESSAGES IN COMPUTER COMMUNICATIONS

(75) Inventors: Mark A. Kirkpatrick, Conyer, GA (US); Darin J. Morrow, Acworth, GA (US); John A. Strohmeyer, Norcross, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 711 days.

(21) Appl. No.: 09/712,931

(22) Filed: Nov. 16, 2000

(51) Int. Cl.[7] .............................................. G06F 15/16
(52) U.S. Cl. ..................... 709/201; 709/201; 709/247; 709/208; 709/209; 709/210; 709/211; 707/10
(58) Field of Search ................................ 709/201, 247, 709/208, 209, 210, 211, 328, 206, 204, 237, 227, 230, 310, 311, 313, 320; 707/10

(56) References Cited

U.S. PATENT DOCUMENTS 6,223,172 B1 * 4/2001 Hunter et al. .................. 707/3
6,446,117 B1 * 9/2002 Gebauer ..................... 709/217

OTHER PUBLICATIONS

American National Standard T1.246–1999, Operations, Adminstration, Maintenance and Provisioning (OAM&P)–Information Model and Services for Interfaces between Operations Systems across Jurisdictional Boundaries to Support Configuration Management, pp. 1–170.

* cited by examiner

Primary Examiner—John Follansbee
Assistant Examiner—Ashok Patel
(74) Attorney, Agent, or Firm—Withers & Keys, LLC

(57) ABSTRACT

A transaction manager facilitates modification and maintenance of data used to provide information regarding computer communications between computer systems. The transaction manager uses a manager file that contains transaction codes-attribute strings and corresponding action values. The transaction code-attribute strings can include mask characters that act as substitution values. When a transaction takes place requiring information regarding a particular attribute of that transaction be sent, the transaction manager consults the manager file to obtain the action value corresponding to the transaction and attribute, or the transaction code-attribute string containing mask characters that can be substituted for the transaction and attribute. The transaction manager performs the action associated with the action value.

22 Claims, 7 Drawing Sheets

```
2112_TCSI = M
2112_DATE = M
2112_BTN = MZ
2112_WTN = FZ
2311_TCSI = M
2311_DATE = M
2311_BTN = M
2311_WTN = M
2140_BTN = MM
```

TCSI
DATE
BTN
WTN
NAME
ADDR1
ADDR2
CITY
STATE
ZIP
PICCHGINDICATOR

Figure 2A

August 2    Return Message with WTN

August 14   Set WTN to zeroes

September 15   Third party changes early - system fails

September 30   Official change date

November 2   Third party changes late - system fails

Figure 2B

| Date | Event |
|---|---|
| August 2 | Return Message with WTN |
| August 14 | Change request - Set WTN to zeroes |
| August 15 | Update manager file - easy to do |
| September 15 | Third party changes early - no failure |
| September 30 | Official change date |
| November 2 | Third party changes late - no failure |

Figure 2C

XXXX_TCSI = M
23XX_ZIP1 = MM
2317_ZIP2 = B

Figure 4

2112_TCSI = M
2112_DATE = M
2112_BTN = MZ
2112_WTN = FZ
2311_TCSI = M
2311_DATE = M
2311_BTN = M
2311_WTN = M
2140_BTN = MM

SYSTEM AND METHOD FOR MANAGING TRANSACTION MESSAGES IN COMPUTER COMMUNICATIONS

BACKGROUND

1. Field of Invention

The present invention relates generally to the field of computer communications systems. More specifically, the present invention relates to the field of managing transaction messages between computer systems.

2. Background of the Invention

Modern computer systems generally consist of a number of applications working with one another to provide services for users. The applications pass messages between one another containing information and data needed by the applications to perform various tasks. A single communication between the applications, including any messages, protocol handshaking and the like is commonly referred to as a transaction. There are many kinds of transactions that are performed in modern computing environments. Each type of transaction is generally identified by a transaction code (TC).

One area in which messaging between computer systems is required is where companies having existing computing systems, known as legacy systems, must communicate with third party systems. This situation occurs frequently, for example, in the case of telephone companies that have existing legacy systems that must communicate with third party systems to perform various tasks, including ordering services, requesting maintenance, checking statuses and changing service.

The third party computers communicate with the telephone company's legacy systems through an interface called an application programming interface ("API"). The API provides a common set of routines that third party computers can invoke to gain access to the legacy systems. The API generally executes on a gateway computer. The gateway computer provides communication and security services for the communication between the legacy systems and the third party computers.

After a transaction is complete, whether successfully or unsuccessfully, it is generally assigned a status indicator (SI), which indicates the result of the transaction. A transaction code/status indicator pair is commonly referred to as a TCSI. The TCSI contains a transaction code representative of a particular transaction, and a status indicator indicating the status of the transaction.

An exemplary conventional system for providing communication between a telephone company's legacy systems and third party computers through a gateway is shown in FIG. 1. Specifically, third party computers 1–5 communicate with legacy systems 102 through gateway 104. In this example, third party computers 3–5 communicate through the Internet 106, whereas third party computers 1 and 2 have direct connections to gateway 104. A firewall 109 can be provided by gateway 104 to provide security for the legacy systems.

Third party computers 1–5 query legacy systems 102 for information. Conventionally, the request is made by completing a request window or screen displayed to the requester. This request window is part of an API 103. To perform the query, a third party computer, for example, third party computer 2, issues a data request to legacy systems 102 through gateway 104. Gateway 104 provides security and request formatting functions for the particular transaction. That is, gateway 104 reformats the request into a request that legacy systems 102 understand. Gateway 104 receives the information requested and formats it into a response that the requester (third party computer 2 in this case) understands. In the system shown in FIG. 1, messages between the third party computers 1–5 and gateway 104 conform to the ANSI standard, ANSI T1.246-1999, Telecommunications, Operations, Administration, Maintenance and Provisioning (OAM&P)—Information Model and Services for Interfaces between Operations Systems across Jurisdictional Boundaries to Support Configuration Management, which is incorporated by reference herein in its entirety.

A significant problem with this communication paradigm is keeping all communicating computers in conformance with the T1.246 standard when changes to the standard are requested. This problem occurs because of the magnitude of the updating that is required to effectuate a change to the standard. There are a few hundred messages in the standard. Each message can have up to 80 fields of data. When a change is requested, all of the fields in all of the messages may have to be updated in accordance with the change.

Under the T1.246 standard, transactions are categorized into transaction types. Whether a transaction is inbound or outbound is defined with reference to the legacy systems. Thus, inbound transactions are those transactions from the third party systems and outbound transactions are those transactions to the third party systems. There are five inbound transaction types. There can be many outbound message types that correspond to the five inbound message types.

For example, when a third party computer sends a request, for example, an ordering request, the resulting response can include up to 80 fields. Due to incomplete information, or prior agreement, not all 80 fields need be sent in each response. The aforementioned problem arises when, for example, one of the third parties decides to change the information that its computer receives in a given response (outbound) transaction. Consequently, even simple changes conventionally require a complete revision and re-release of the software executing on gateway 104 even though the data elements are defined in the T1.246 standard. New revisions of code require code modification, rebuilding and testing. This is a time consuming and expensive process that can take more than four months to complete.

Thus, there is a need for a system and method for facilitating these changes without requiring modification to the software executing on the gateway and its consequent rebuilding and testing.

SUMMARY OF THE INVENTION

The present invention solves the problems described above by significantly simplifying the management of transaction codes and their associated attributes. Rather than statically managing the many transaction types and attributes individually in the software, the present invention compresses the transaction types using masks. In this manner, attributes for transaction types requiring similar treatment are provided that treatment using a single mask representation of the transaction type, rather than repeating that information for each of the attributes to be afforded common treatment.

Each mask is a template that can apply to one or a plurality of attributes. An action value is associated with each mask. That action value applies to all messages satisfying the mask. The masks and associated attributes are stored in a file that is easily accessed and modified by the user.

For example, every outbound transaction includes a TCSI attribute, described above. To provide the appropriate mask for every attribute, the prefix "XXXX" replaces the transaction type of a conventional system. For example, the present invention replaces the eight lines:

2312_TCSI=M

2140_TCSI=M

2112_TCSI=M

2317_TCSI=M

2755_TCSI=M

2710_TCSI=M

2804_TCSI=M with the single mask line

XXXX_TCSI=M.

This compression becomes much more pronounced as the file size increases from eight lines to the tens of thousands of lines in conventional transaction type-attribute files. For example, consider changing all the TCSI attributes from M to MM. To make this change in a conventional system requires searching for all of the TCSI attributes in a file— there could be literally hundreds—and making the change. Using the present invention, this change is accomplished virtually instantaneously by changing a single line, XXXX_TCSI=MM. Thus, the present invention significantly facilitates managing transaction types and responding to changing requirements. Thus, the present invention eliminates the need for software rebuilds and code testing to implement changes.

In one embodiment, the present invention is a system for managing transactions between a first computer system and a second computer system. The system includes a management file containing at least one transaction type-attribute string having a mask format with a corresponding action value. A process executing on a computer determines what action to take in accordance with the at least one transaction type-attribute string.

In another embodiment, the present invention is a method for managing transactions between a first computer system and a second computer system. The method includes the steps of creating a manager file containing at least one transaction type attribute string having a masked format and a corresponding action value. At some point an inbound transaction request is received. The inbound transaction request is processed. A response transaction type-attribute string having an appropriate attribute for responding to the inbound transaction request is determined. The method then performs the step of determining if the response transaction type-attribute string matches one of the at least one transaction type-attribute strings in the manager file. If a match is found, the method performs the step of responding to the input transaction request in accordance with the action value associated with the action value corresponding to the transaction type-attribute string that matched the response transaction type-attribute string.

Thus, one object of the present invention is to facilitate management of TCSI codes.

Another object of the present invention is to facilitate responding to changing TCSI code requirements.

Another object of the present invention is to reduce the file size and memory requirements for storing TCSI codes.

Another object of the present invention is to ease updating and maintenance of files used to store TCSI codes.

Another object of the present invention is to reduce the likelihood of errors generated by changing TCSI code requirements.

Another object of the present invention is to reduce the time required to react to changing TCSI code requirements.

These and other objects of the present invention are described in greater detail in the detailed description of the invention, the appended drawings and the attached claims.

BRIEF DESCRIPTION OF THE DRAWINGS

FIG. 2A is a schematic diagram of a system for providing transaction procession between computer systems according to a preferred embodiment of the present invention.

FIG. 2A is a list of exemplary transaction codes.

FIG. 2B is a timeline scenario of events resulting in failure using conventional systems.

FIG. 2C is a timeline scenario of events according to a preferred embodiment of the present invention.

FIG. 3 is an exemplary management file according to a preferred embodiment of the present invention.

FIG. 4 illustrates exemplary masks according to a preferred embodiment of the present invention.

DETAILED DESCRIPTION OF THE PREFERRED EMBODIMENTS

Figure 1:
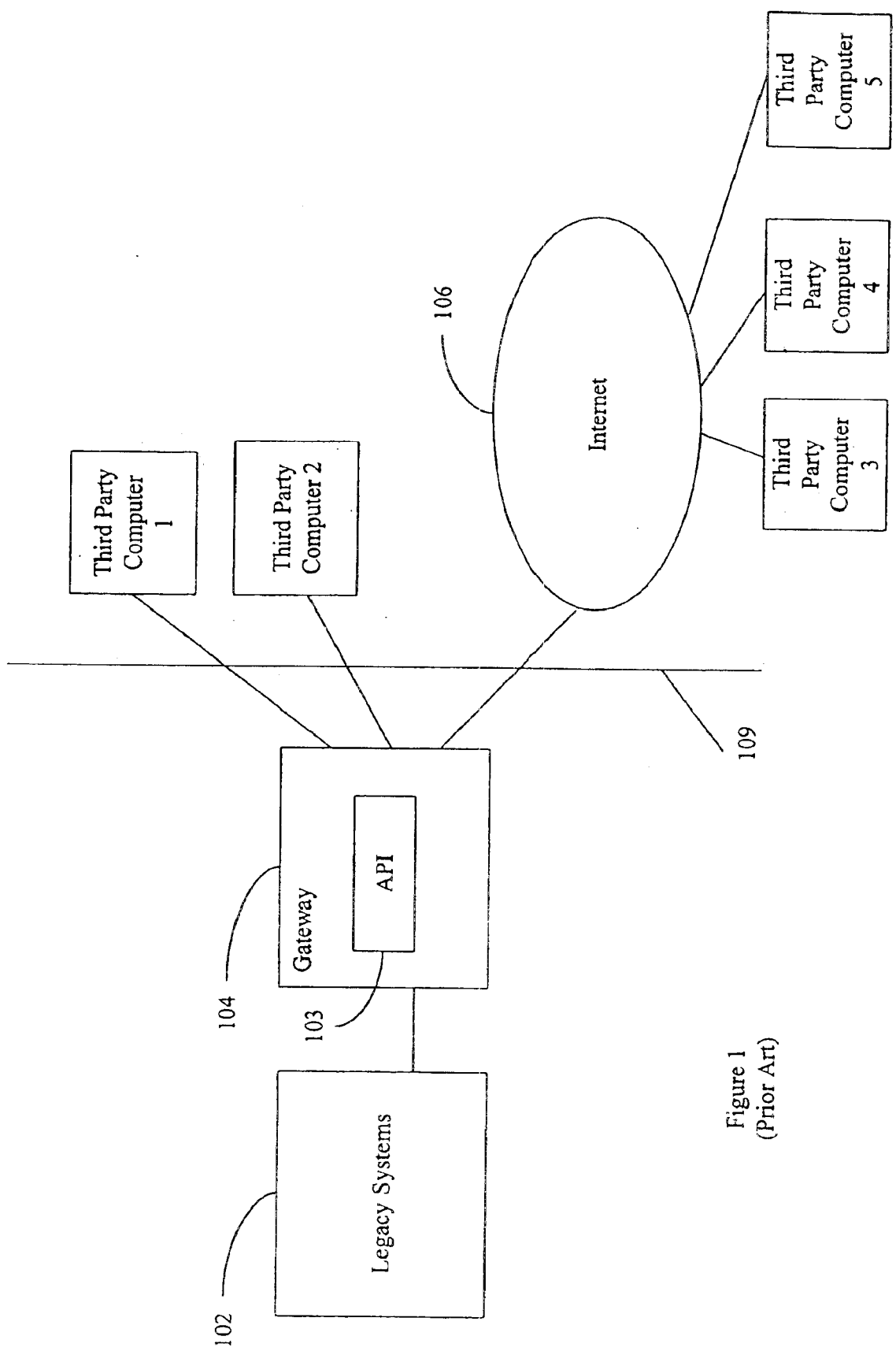
FIG. 1 is a schematic diagram of a prior art system for providing transaction processing between computer systems.
Figure 1A:
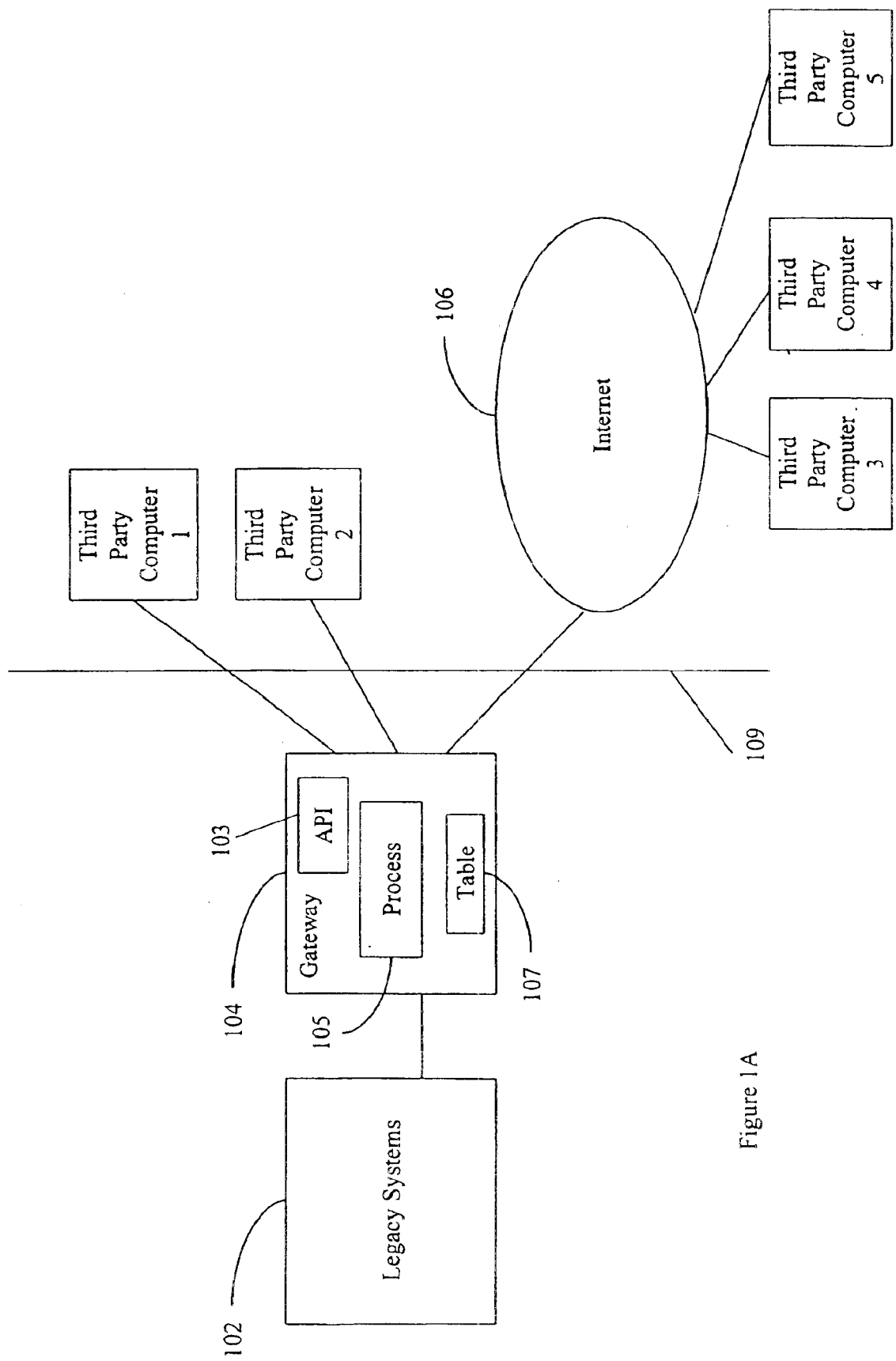

The present invention is a message manager for managing transaction messages between legacy systems at a telephone company and third party requesters through a gateway. For example, such messages include request messages from third party requesters and response messages from legacy systems. FIG. 1A is a schematic diagram of a system incorporating a preferred embodiment of the present invention. The system in FIG. 1A is similar to the system in FIG. 1, but adds a process 105 and a data structure, or table, 107 that is stored in a computer memory. The data structure is a transaction code manager file. Briefly, when a third party computer makes a request of the legacy systems, process 105 analyzes the request to determine the proper format for a response to the request. To make the determination, process 105 consults table 107. Table 107 contains masked transaction code-attribute string pairs that facilitate managing and modifying the transaction code-attribute pairs. Process 105 and table 107 are described in greater detail below.

FIG. 2A illustrates the fields that might be sent back in an exemplary legacy system response message (outbound transaction) 200 that can be sent in response to an inbound transaction from a third party. For example, the response message can correspond to a transaction code of 21 and a status indicator of 12. It would be apparent to those skilled in the art that the present invention applies to all transaction codes and status indicators that might be encountered.

FIG. 2B presents a scenario using the transaction code illustrated in FIG. 2A that could occur in a prior art system. Assume for example that on date 1, e.g. August $2^{nd}$, response message 200 includes a working telephone number (WTN) field as shown in FIG. 2B. On a later date, date 2, for example August $14^{th}$, a request is submitted to change the T1.246 standard to set the WTN field to 0. An implementation date, for example September $30^{th}$ is set for when the change is to be officially implemented. However, for a variety of reasons, the official date is not always when the change is implemented. For example, the third party may implement the change late, for example on November $2^{nd}$. Because the response message includes the WTN field set to 0, the third party's system will likely malfunction if it expects to see values other than all zeroes in the WTN field. Alternatively, the third party might implement the change early, for example on September $15^{th}$. In this case, the third party's system may not function correctly because it is expecting to see the WTN field set to 0, and it is not.

FIG. 2C presents a scenario using the transaction code illustrated in FIG. 2A according to a system employing the message manager of the preferred embodiment of the present invention. As before on date 1 (August $2^{nd}$) response message 200 includes a working telephone number (WTN) field as shown. On a later date, date 2, for example August $14^{th}$, a request is submitted to change the standard to set the WTN field to 0. In this case, a manager file (described below) is updated to reflect the change request even though the change has not yet been implemented in the system on date 3, for example August $15^{th}$. A manager file is created for each outbound transaction type. When a transaction code is encountered, the transaction file 13 corresponding to the transaction code is consulted to determine how to respond to the transaction. On date 4, November $2^{nd}$, the new release of the standard is implemented. Thus, on September $30^{th}$, when the WTN field is set to 0, there is no disruption of service because the manager file is consulted and knows how to handle the transaction code.

FIG. 3 illustrates an exemplary manager file 300 according to a preferred embodiment of the present invention. Manager file 300 removes the hard coding of transaction type field found in the messaging software of conventional systems. According to the preferred embodiment of the present invention, transaction type fields are stored in a manger file 300, along with a corresponding action to be taken when each field is encountered. Preferably, manager file 300 is loaded into a manager table residing in computer memory at runtime.

Manager file 300 contains a list of transaction type-attribute strings. Associated with each transaction type-attribute string is a requirement for the attribute in the transaction type. For example, in FIG. 3, the transaction type-attribute string "2112_TCSI" has the action value M. This means that for a 2112 transaction, a TCSI attribute is mandatory. The possible transaction types are well-known to those skilled in the art and can be found in the T1.246 standard referenced above.

A list of requirement values according to the preferred embodiment of the present invention is given in Table I.

TABLE I

Transaction type-field requirement values

| Requirement | Meaning |
| --- | --- |
| M | Mandatory - The attribute must be present in the transaction message. |
| MZ | Zeroes - Set attribute to "zeroes" if there is no data already present. |
| FZ | Force Zeroes - The attribute must be set to zero no matter the response data. |
| MM | Mirror Maybe - Return what is in the request (invoke) message if there is no data already present in the original return data. |

TABLE I-continued

Transaction type-field requirement values

| Requirement | Meaning |
| --- | --- |
| FM | Force Mirror - Always return what is in the request (invoke) message. |
| FS | Force Space - Set attribute to "spaces" always. |
| B | Blanks - Attribute may be a blank (space) that means something. |
| N | Not Sent - Do not send attribute. |
| Y | Sent - Send attribute. This is typically the default case. |
| MS | Set attribute to "spaces" if there is no data already present |

Exemplary transaction type-attribute entries and corresponding attribute requirements values for 3 transaction types, 2112, 2311 and 2140, stored in manager file 300 are shown in FIG. 3. In T1.246 messaging, there are approximately 200 transaction types. As described above each transaction type has 80 attributes. Thus, manager file 300 could have more than 16000 entries if all entries are populated. As a result, its management is a time-consuming, costly and cumbersome task that is prone to error. For example, to change a value for all TCSI fields, the operator must search for the TCSI field in every translation type.

The present invention avoids the need for listing, and consequently, managing every transaction type and every attribute, by using substitution masks. The substitution masks are essentially global place holders that values are substituted for. FIG. 4 shows an exemplary use of the masks of the present invention. Referring to FIG. 4, there is shown a manager file 402 having 3 transaction type-attribute strings 404, 406 and 408.

If a request comes in requiring a 2317 response for the ZIP2 attribute, software according to the present invention, executing on a computer such as gateway 104, consults manager file 402 to try to find a transaction type-attribute string having a value of "2317_ZIP2." In this case, process 105 finds the transaction type-attribute string 404. Process 105 obtains the requirement value associated with transaction type-attribute string 404 (B in this case) and performs the appropriate action for that requirement value.

If a request comes in requiring a 2317 response for the ZIP1 attribute, software according to the present invention, executing on a computer such as gateway 104, consults manager file 402 to try to find a transaction type-attribute string "2317_ZIP1." In this case, process 105 does not find transaction type-attribute string "2317_ZIP1." When it cannot find the exact transaction type-attribute string, process 105 looks for a mask that matches the transaction type-attribute string. In this case, process 105 finds transaction string 406 "23XX_ZIP1." The "XX" in transaction string 406 is the substitution mask. The "XX" can take on any value. That is, the transaction type-attribute applies to any transaction type having the first two numbers 23 and, in this case, attribute ZIP1. Process 105 obtains the requirement value, MM in this case, and performs the appropriate action for that requirement value.

If a request comes in requiring a 2317 response for the TCSI attribute, process 105 consults manager file 402 to try to find a transaction type-attribute string "2317_TCSI." In this !5 case, process 105 does not find a transaction type-attribute string "2317_TCSI." When it cannot find the exact transaction type-attribute string, process 105 looks for a mask that matches the transaction type-attribute string. In this case, process 105 finds transaction string 408 "XXXX_TCSI." As before, the "XXXX" in transaction string 408 is a substitution mask. The "XXXX" can take on any value. In this case, the transaction type-attribute applies to any transaction type and, in this case, attribute TCSI. Process 105 obtains the requirement value, M in this case, and performs the appropriate action for that requirement value.

In the preferred embodiment of the present invention, process 105 looks first for a literal match, and then looks for matches through masks. In addition, preferably, process 105 looks for the least amount of masking possible. For example, for a request requiring a 2317_ZIP1 response, process 105 uses the requirement value associated with 23XX_ZIP1, rather than XXXX_ZIP1, if both are present in a manager file. Thus, in the preferred embodiment literal matches override masked matches.

It can be seen then that the generic masks of the present invention allow for the compression of large numbers of the transaction type-attribute entries into a relatively small number of entries. For example, because the TCSI attributes are required for every transaction type, providing a transaction type-attribute string "XXXX_TCSI=M" in a manager file according to the present invention reduces what conventionally required 200 entries (one for each transaction type), to only one entry. The optimization of this compression depends on the requirements of the second computer system.

In the preferred embodiment of the present invention, manager file 300 is loaded into a data structure in memory at runtime. This process requires reading each of the transaction type-attribute entries along with their corresponding requirement values and storing them in a table in a data structure in runtime memory, for example table 107. Creating table 107 from manager file 300 at runtime would be apparent to those of skill in the art.

In the preferred embodiment of the present invention, comments can be added to manager file 300. Comments can be provided for any purpose, for example, for explanations. In the preferred embodiment, comments are indicated by a "#" symbol as the first character of a line in manager file 300.

Figure 5:
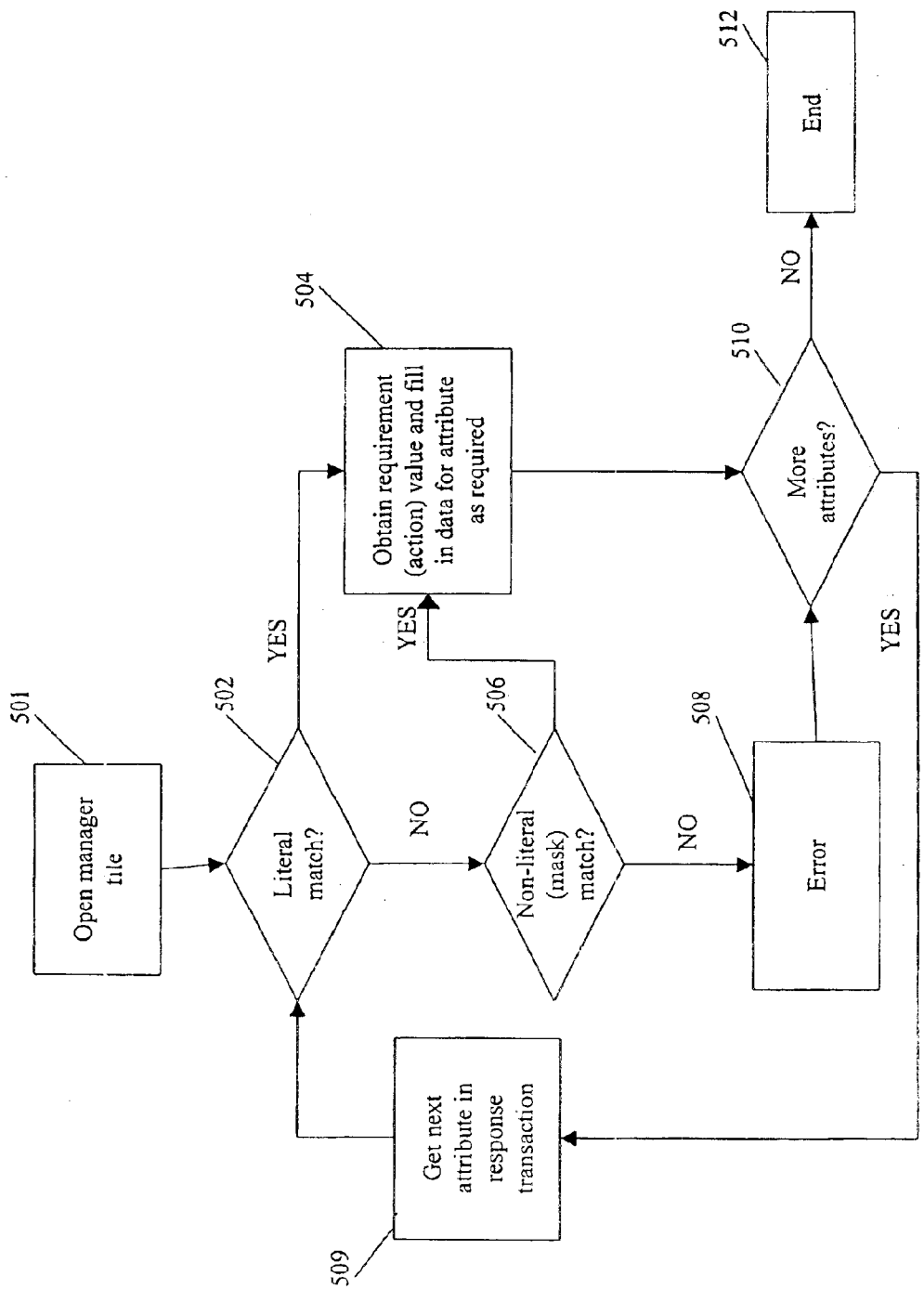
FIG. 5 is flow diagram of a process for transaction processing between computer systems according to a preferred embodiment of the present invention.

A flow chart for process 105 according to a preferred embodiment of the present invention is illustrated in FIG. 5. Referring to FIG. 5, when a response, identified by a transaction type, is received by gateway 104 from legacy systems 102, process 105, for each attribute in the response, first determines if there is a literal match for the attribute and corresponding transaction type in step 502. If there is such a match, process 105 continues in step 504 where it obtains the requirement value associated with the transaction type-attribute string and fills in the value of the response in accordance with the requirement value associated with the transaction type-attribute string. If there is no literal match, process 105 determines, in step 506, whether there is a mask that matches the response. As described above, step 506 tries to find the mask that is closest to a literal match. If there is a matching mask, process 105 continues in step 504 where it obtains the requirement value associated with the transaction type-attribute string and fills in the value of the response in accordance with the requirement value associated with the transaction type-attribute string. If there is no matching mask, then in step 508 process 105 indicates that an error has occurred. Whether an appropriate action has been taken in step 504 or an error is indicated in step 508, process 105 continues in step 510, where it determines if there are any more attributes in the response. If there are more attributes, process 105 gets the next attribute in step 509. If there are no more attributes process 105 ends in step a 512.

The message manager of the present invention is primarily related to the outbound messages, as inbound messages are not expected to change frequently. However, should this assumption prove erroneous, the techniques described herein can be applied to inbound transaction messages as well.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A system for managing transactions between computer systems, comprising:
    a receiving computer system that receives a request message from a first computer system, wherein the request message corresponds to a response having one or more transaction types and having one more attributes for each of the one or more identified transaction types;
    a management file accessible by the receiving computer system and containing a plurality of transaction type-attribute strings comprising a transaction type identified by a transaction code having one or more characters masked so as to represent multiple transaction types, the plurality of strings further comprising an attribute and an associated action value representing an action to be taken by the receiving computer system for the attribute, wherein the management file contains a reduced number of transaction type attribute strings for matching a given number of transaction type attribute strings with respect to a management file containing transaction type attribute strings for matching the given number of transaction type attribute strings without the transaction code having one or more characters masked; and
    a process implemented by the receiving computer system that determines what action to take in response to the received request message by comparing one of the corresponding transaction codes with the transaction type of the plurality of transaction type-attribute strings of the management file to find a transaction type-attribute string that matches both the transaction type and one of the attributes corresponding to the received request.

2. The system recited in claim 1, wherein the receiving computer system is a gateway computer to which the first and a second computer systems are connected, and through which the first and second computer systems communicate with one another, wherein the process is executed on the gateway computer.

3. The system recited in claim 2, wherein the management file is loaded into a memory residing on the gateway computer at runtime.

4. The system recited in claim 1, wherein the management file further contains an additional at least one transaction type-attribute string having a corresponding action value, the additional at least one transaction type-attribute string not having a mask format.

5. The system recited in claim 4, wherein the process looks for a literal match to the transaction type prior to looking for a non-literal match and wherein a literal match is one with no characters masked and a non-literal match is one with at least one character masked.

6. The system recited in claim 5, wherein the process performs an action determined by the transaction type-attribute string that is a non-literal match and that has the minimum mask.

7. A method for managing transactions between computer systems, comprising the steps of:
(a) creating a management file containing a plurality of transaction type-attribute strings comprising a transaction type identified by a transaction code having one or more characters masked so as to represent multiple transaction types, the plurality of strings further comprising an attribute and an associated action value representing an action to be taken by the receiving computer system for the attribute, wherein the management file contains a reduced number of transaction type attribute strings for matching a given number of transaction type attribute strings with respect to a management file containing transaction type attribute strings for matching the given number of transaction type attribute strings without the transaction type having one or more characters masked;
(b) receiving an inbound transaction request;
(c) processing the inbound transaction request to determine a transaction type and an attribute for the transaction type that corresponds to the inbound transaction request;
d) based on the determined transaction type, determining a response transaction type-attribute string having no masked characters and having an appropriate attribute for responding to the inbound transaction request;
(e) determining if the response transaction type-attribute string having no masked characters matches one of the at least one transaction type-attribute strings in the management file; and
(f) if a match is found, responding to the input transaction request in accordance with the action value associated with the transaction type-attribute string that matched the response transaction type-attribute string.

8. The method recited in claim 7, further comprising the steps of:
(g) populating the management file with at least one additional transaction type-attribute string with a corresponding action value, the at least one additional transaction type-attribute string not having a mask format;
(h) determining if the response transaction type-attribute string literally matches one of the at least one additional transaction type-attribute strings; and
(i) if there is a literal match, responding to the inbound transaction request in accordance with the action value associated with one additional transaction type-attributes strings that matched.

9. The method recited in claim 8, further comprising the step determining if there is literal match prior to determining if there is a match having a mask, where a literal match is one with no masked characters.

10. The method recited in claim 8, further comprising the step of generating an error message if there is no transaction type-attribute string that matches the response transaction type-attribute string.

11. The method recited in claim 7, further comprising the step of storing the management file in a computer memory at runtime.

12. The method recited in claim 8, further comprising the step of using the transaction type-attribute string having the minimum mask but still matching the response transaction type-attribute string.

13. The method recited in claim 8, further comprising the step of repeating steps (a) through (i), for each attribute in a response type corresponding to the input transaction request.

14. A system for managing computer transactions between a first computer system and a second computer system, comprising:
a gateway computer providing communication between the first computer system and the second computer system;
a process, which when executing on the gateway computer, takes a transaction request from the first computer system, reformats the transaction request into a request the second computer system can process, transmits the reformatted transaction request to the second computer system, receives a response transaction from the second computer system, reformats the response transaction into a format the first computer can process, at least a portion of the response transaction being based on a table containing a plurality of transaction type-attribute strings comprising a transaction type identified by a transaction code having one or more characters masked so as to represent multiple transaction types, the plurality of strings further comprising an attribute and an associated action value representing an action to be taken by the receiving computer system for the attribute, wherein the table contains a reduced number of transaction type attribute strings for matching a given number of transaction type attribute strings with respect to a table containing transaction type attribute strings for matching the given number of transaction type attribute strings without the transaction type having one or more characters masked.

15. The system recited in claim 14, wherein the table is stored in a memory on the gateway computer.

16. The system recited in claim 15, wherein the table is stored in memory at runtime.

17. The system recited in claim 14, wherein the table includes at least one additional transaction type-attribute string that does not have a mask format.

18. The system recited in claim 17, wherein the process determines a response transaction type-attribute string from the response transaction type string and one of the transaction type strings in the table.

19. The system recited in claim 18, wherein the process looks for a literal match prior to looking for a non-literal match, wherein the literal match is one with no characters masked.

20. A data structure stored in a computer memory of a receiving computer, comprising: a plurality of transaction code-attribute pairs, each transaction code-attribute pair comprising a transaction code portion and an attribute portion and being associated with an action value, wherein at least one of the plurality of transaction code-attribute pairs contains a mask value within the transaction code so as to represent a plurality of transaction code-attribute pairs and thereby reduce the number of transaction code-attribute pairs that are stored in computer memory relative to a number of transaction code-attribute pairs without having a mask value that is necessary to represent the plurality of transaction-code attribute pairs, and wherein one transaction code-attribute pair has a most literal correspondence to a particular request sent from a first computer such that an action value for the particular request is determined by finding the transaction code-attribute pair having the most literal correspondence.

21. The data structure recited in claim 20, further loaded into the computer memory at run time.

22. The data structure recited in claim 20 further comprising a plurality of transaction code attribute pairs having a mask value in the transaction code portion, wherein the mask value of at least one of the transaction code portions of the plurality of transaction code attribute pairs having a mask value in the transaction code portion replaces only a portion of the transaction code portion.

* * * * *